United States Patent [19]

Krejci et al.

[11] 4,185,141
[45] * Jan. 22, 1980

[54] PRODUCTION OF COATED STRUCTURAL ELEMENTS COMPRISING INORGANIC BINDERS

[75] Inventors: Milan Krejci; Peter Kresse, both of Krefeld, Fed. Rep. of Germany

[73] Assignee: Bayer Aktiengesellschaft, Leverkusen, Fed. Rep. of Germany

[*] Notice: The portion of the term of this patent subsequent to Sep. 26, 1995, has been disclaimed.

[21] Appl. No.: 875,024

[22] Filed: Feb. 2, 1978

Related U.S. Application Data

[63] Continuation-in-part of Ser. No. 721,128, Sep. 7, 1976, Pat. No. 4,117,197.

[30] Foreign Application Priority Data

Feb. 19, 1977 [DE] Fed. Rep. of Germany ....... 2707228

[51] Int. Cl.² .................. B32B 9/04; B32B 13/04
[52] U.S. Cl. .................. 428/446; 52/517; 427/299; 427/369; 427/314; 427/370; 427/380; 427/403; 427/419 R; 427/427; 428/539
[58] Field of Search ........... 427/369, 299, 370, 301, 427/379, 380, 403, 427, 419 R, 419 A, 419 G, 314; 428/446, 443, 454, 539; 52/517

[56] References Cited

U.S. PATENT DOCUMENTS

| 2,294,247 | 8/1942 | Smith | 427/403 |
|---|---|---|---|
| 2,347,684 | 5/1944 | Hatch et al. | 427/380 |
| 2,350,030 | 5/1944 | Greider et al. | 427/380 |
| 2,354,350 | 7/1944 | Schuetz | 427/379 |
| 2,354,351 | 7/1944 | Schuetz | 427/379 |
| 2,372,285 | 3/1945 | Marc et al. | 428/446 |
| 2,683,096 | 7/1954 | Eckert et al. | 428/446 |
| 2,687,359 | 8/1954 | Cleary | 428/446 |
| 2,720,469 | 10/1955 | Serkin | 427/403 |
| 2,946,158 | 7/1960 | Seipt | 428/446 |
| 3,169,075 | 2/1965 | Morrow et al. | 428/454 |
| 3,197,529 | 7/1965 | Greiner | 428/446 |
| 3,488,209 | 1/1970 | Ayers et al. | 427/299 |
| 3,759,774 | 9/1973 | Bader et al. | 427/370 |

FOREIGN PATENT DOCUMENTS

473158  10/1937  United Kingdom ............ 427/403

Primary Examiner—Michael F. Esposito
Attorney, Agent, or Firm—Sprung, Felfe, Horn, Lynch & Kramer

[57] ABSTRACT

In the production of a coated structural element by producing a workable composition of an inorganic binder and water, forming the composition into a structural element, providing an inorganic salt at least on the surface of the structural element, applying to the surface of the structural element an aqueous paste containing at least one metal oxide and waterglass thereby to form a gel-like non-fluid coating and hardening the coated structural element, the improvement which comprises hardening the structural element prior to applying the aqueous paste thereto, whereby the resulting coating is of enhanced weather resistance. The inorganic salt may be provided on the surface by being present in the workable composition per se or by being present in a facing layer applied to the structural element. It can also be provided by being sprayed thereon as an aqueous solution in which event the first hardening must precede such spraying. The resulting coatings are of enhanced weather resistance.

24 Claims, No Drawings

PRODUCTION OF COATED STRUCTURAL ELEMENTS COMPRISING INORGANIC BINDERS

This application is a continuation-in-part of Application Ser. No. 721,128, filed Sept. 7, 1976, now U.S. Pat. No. 4,117,197, issued Sept. 26, 1978, the disclosure of which is incorporated herein by reference.

It is known that prefabricated concrete sections can be produced by introducing a generally pigmented concrete mixture into a suitable mold, followed by hardening, optionally after a surface treatment with a pigmented cement slurry. Concrete roof tiles are produced, for example, by machine-extruding the generally pigmented concrete mixture in molds (so-called pallets). The extruded concrete roof tile may then be coated over its surface with a thin, similarly pigmented cement slurry into which colored sand granulate has been strawn (R. E. Paasch: Eigenschaften und Herstellung farbiger Betondachsteine unter Verwendung anorganischer Pigmente (Properties and Production of Colored Concrete Roof Tiles Using Inorganic Pigments), Betonstein-Zeitung, No. 10, 1959; H. E. Schulz: Der Betondachstein und seine Herstellung in Deutschland (The Concrete Roof tile and its Production in Germany), Betonstein-Zeitung, No. 5, 1964). However, it is also possible to use the extruded concrete roof tile without any further treatment. The pallets are automatically stacked and introduced into a so-called curing chamber for setting the concrete. After setting, the tiles are separated from their molds (which are returned immediately to the production process), while the tiles themselves are either sprayed with an emulsion paint, for example based on acrylate, or are immediately stored.

It is also known that asbestos cement sheets can be coated with a glaze-like coating, preferably based on silicate. In addition to $SiO_2$, silicate-containing coatings of this kind contain other constituents such as, for example, oxides, carbonates with magnesium, lead, calcium, boron and zinc preferably being present as cations. In general, an aqueous color paste, consisting essentially of waterglass and, for example, zinc oxide as the oxidic component, is sprayed onto the already hardened asbestos cement sheets in such a quantitative ratio that glaze-like zinc silicates can be formed. Hardening of the coating to form silicates is carried out either in an autoclave under pressure at elevated temperatures or by a purely thermal treatment under normal pressure. The base sheet and the coating are therefore produced in two operations separated from one another by a time interval.

Any attempt to produce prefabricated concrete sections and concrete roof tiles with a glaze-like coating in the same way gives very unsatisfactory results because the glaze is only of inadequate quality.

Although the coating of the concrete does not involve any particular problems, the porosity and unevenness of the surface make it absorbent to different extents with the result that, after the waterglass coating has hardened, a film of irregular thickness and varying composition is formed. After the coating has hardened, this results in crack formation which is clearly discernible after weathering tests. After boiling tests for example (boiling of coated samples in distilled water for short-term testing of the coating), those areas of the concrete roof tiles which have been coated too thinly are found to develop a number of cracks in the coating, the calcium hydroxide liberated from the concrete being deposited to a large extent on the surface of the waterglass coating. Frost tests (freezing and thawing cycles which are intended to simulate the stresses to which the tiles are subjected in winter time) also produce clearly discernible crack formation.

Because of the above-mentioned deficiencies in quality, which are clearly visible after the short-time weathering tests alone, the coating of hardened structural elements such as concrete roof tiles and prefabricated concrete sections, by conventional methods is inadequate for practical application.

Accordingly, an object of the present invention is to develop a simple process for applying glaze-like coatings to preformed, hardened structural elements, such as prefabricated concrete sections and concrete roof tiles, which show adequate strength, adhesion, uniformity and resistance to weather.

The present invention provides a process for coating preformed structural elements, such as prefabricated concrete sections and concrete roof tiles, based on binders containing the usual additives with glaze-like silicate-coatings, in which a workable composition is produced from the inorganic binder and water and the usual additives, structural elements are formed from this composition and hardened, an aqueous paste containing waterglass and metal oxides and, optionally, pigments and fillers is applied in a thin layer to the hardened structural elements and thereafter is also hardened, characterized in that (a) soluble inorganic salts are initially introduced into the workable composition or into a facing layer up to about 50 mm thick applied to the formed structural element in a minimum quantity of about 0.5% by weight, based on the inorganic binder, after which the formed structural element is hardened on its own or (when a facing layer is present) together with the facing layer, or (b) the formed structural element is hardened on its own or (when a facing layer is present) together with the facing layer, and an aqueous approximately 5 to 15% salt solution is then applied to the hardened structural element in a quantity of from about 40 to 100 $g/m^2$ and dried for about 3 to 15 minutes, after which an aqueous paste containing waterglass and metal oxides is applied in a thin layer to the hardened structural element and is also hardened after conversion into a gel-like, non-fluid state.

The composition which is used as a starting material for producing the structural elements has a water-binder (cement) factor (ratio by weight of water to cement) of about 0.3 to 0.5. In addition, it may contain the usual additives such as extenders, for example sand, pigments such as, for example, iron oxides, sealing agents such as, for example, calcium stearate, plasticizers such as lignin sulphonate for example, in the usual quantities (Albrecht, Mannhertz, Zusatsmittel, Anstrichstoffe, Hilfstoffe fur Beton und Mortel (Additives, Coating Compositions and Auxiliaries for Concrete and Mortar), 1968, pages 38 et seq, Bauverlag GmbH, Wiesbaden).

A few embodiments of the process according to the invention will now be discussed in detail.

In one embodiment, inorganic compounds are added to the cement-containing compositions from which the structural element is formed. The inorganic compounds convert a paste applied to the preformed structural elements after they have hardened and consisting of an aqueous mass containing waterglass and/or phosphates and metal oxides and, optionally, pigments and fillers, into a gel-like non-fluid state. The inorganic salts are used in quantities of from about 0.5 to 5% by weight, based on the cement. In another embodiment of the process according to the invention, a facing layer which, depending upon the method of compaction applied, reaches a layer thickness usually of from about 1 to 50 mm, preferably about 1 to 20 mm, is applied as uniformly as possible to the preformed structural element before it hardens. The facing layer may be compacted in the absence of pressure, for example by vibration or, for example, by rubbing in or by extrusion. This facing layer contains inorganic binders, optionally the usual additives and/or water and also the soluble inorganic salts which convert an aqueous paste based on waterglass and metal oxide applied to the facing layer on the preformed hardened structural elements into a gel-like non-fluid state. In this embodiment, the soluble inorganic salts are added in quantities of from about 0.5 to 5% by weight (based on the quantity of cement in the facing layer). About 1 to 2% by weight, based on the quantity of cement in the facing layer, of soluble inorganic salts are preferably added to the facing layers.

In another embodiment, it is not necessary, for obtaining a hard and weatherproof glaze-like coating according to the invention on the structural elements, to add the inorganic salts to the composition or to the facing layer. Instead, the composition used as a starting material for producing the structural elements can be prepared in the same composition as indicated above with the difference that no soluble inorganic salts are added to the composition or to the facing layer. In this case, a workable composition is prepared from the binder (cement in the case of concrete roof tiles and prefabricated concrete sections) and water and the usual additives, and structural elements are formed from this composition and subsequently hardened. An aqueous salt solution in a concentration of from about 5 to 15% is applied, for example by spraying, to the hardened structural elements, and dried for about 3 to 15 minutes. An aqueous paste containing waterglass and metal oxides and, optionally, pigments and/or fillers is then applied in a thin layer to the surface of the hardened structural element treated with salt solution and is also hardened after conversion into a non-fluid state.

The aqueous paste containing waterglass and metal oxides and, optionally, pigments and/or fillers is applied to the preformed structural element in quantities of from about 200 to 500 g/m$^2$, resulting in the formation of a thin layer.

According to the invention, suitable inorganic salts which are added either to the workable compositions containing the inorganic binder in homogeneous distribution or to the facing layer, or are applied in aqueous solution to the surface of the hardened structural element, are alkaline earth metal salts such as, for example, calcium formate, calcium chloride, calcium nitrate, magnesium nitrate or magnesium chloride, or alkali metal salts such as, for example, potassium chloride, sodium formate or sodium acetate, for example. The alkali metal salts are generally added in relatively large quantities, preferably in quantities which correspond to the upper limits referred to above. The preferred compounds added are calcium formate and/or chloride. These compounds may be added to the composition or to the facing layer either as such or in the form of aqueous solutions.

In the embodiment in which a facing layer is applied to the structural element before hardening, the facing layer may in addition contain the usual additives as already described in connection with the composition of the preformed structural elements. The composition from which the structural elements are formed and the facing layer preferably contain the same inorganic binder, namely cement.

In the case of facing layers based on cement, the water/cement factor may amount to between 0 and about 0.5 and preferably amounts to between 0 and about 0.4.

The preformed structural elements which either contain the soluble inorganic salts in homogeneous distribution or to which a facing layer containing the inorganic salts is applied, are subsequently hardened. Hardening is normally carried out in a steam chamber at temperatures of up to about 65° C. and at relative air humidity levels of from about 95% to 100%. The hardening time is generally about 6 to 8 hours. Another method of hardening the formed structural elements is to harden them conventionally in air over periods ranging from about 14 to 28 days.

An aqueous paste containing waterglass and metal oxides and, optionally, pigments and/or fillers is then applied in a thin layer to the preformed hardened structural elements. The composition of the pastes with which the preformed hardened structural elements with or without a facing layer can be coated in accordance with the invention may vary within relatively wide limits. Preferred coating pastes contain alkali metal silicate, for example sodium silicate in aqueous solution (waterglass), metal oxides, for example ZnO, MgO, PbO, CaO or $B_2O_3$, either individually or in any combination, the $SiO_2$-content amounting to between about 42 and 63 mole %, the $Na_2O$-content to between about 11 and 27 mole % and the total metal oxide content to between about 19 and 42 mole % (based on the total weight of these components). Oxide-containing compounds such as, for example, carbonates may also be used for the necessary metal oxide content of the paste. The paste may also contain pigments, for example $TiO_2$, red, yellow or black iron oxides and/or iron oxide hydroxides, chromium oxide pigments, and standard fillers such as, for example, kaolin and calcium carbonate. The pigments, fillers and water are added in such quantities that a readily processible, sprayable and spreadable paste is obtained. In addition, the pigment and/or filler content of the paste should not exceed about 25% by weight and should preferably be between about 10 and 15% by weight. Pastes such as these based on waterglass are known, for example, from J. G. Vail "Soluble Silicates", Vol. II, pages 322 et seq (1952), Reinhold Publishing, New York; U.S. Pat. No. 2,354,350 and German Offenlegungschrift No. 1,571,579.

One typical example of a waterglass paste which can be used according to the invention has the following composition:

| | |
|---|---|
| Sodium waterglass, 37 to 40° Be | 70 parts by weight |
| Zinc oxide | 15 parts by weight |
| Kaolin | 5 parts by weight |
| Pigment | 5 parts by weight |
| Water | 5 parts by weight. |

The process according to the invention will now be described with reference to a preferred coating paste based on water-glass.

The various components of the waterglass paste are processed into a homogeneous paste, for example in a dissolver or in ball mills, and are thinly sprayed or coated (in a layer thickness of about 40 to 80 μm) in this form onto the preformed structural elements themselves or, if they contain a facing layer, onto the facing layer. Approximately 200 to 500 g and preferably from 300 to 400 g of waterglass paste are used per square meter of surface area of the preformed structural element to be coated.

After the waterglass paste has been applied to the preformed structural element, it is first left to harden into a gel-like non-fluid state. In the case of structural elements coated in accordance with the invention, this gelling process takes about 30 minutes to 1 hour. After gelling, the gelled coating is also hardened.

This second hardening process may take place in an indirectly electrically heated autoclave at temperatures of about 150° to 210° C. and preferably at temperatures of about 170° to 180° C. under pressures of about 4 to 19 bars and preferably under pressures of about 7 to 10 bars. At the temperatures indicated, the hardening time is about 4 to 8 hours.

However, it is not necessary to carry out the second hardening process in an autoclave in order to obtain a hard weatherproof glaze-like coating on the prefabricated concrete sections.

Thus, the second hardening process may be carried out in a dry atmosphere. The coating of structural elements with waterglass may be carried out at a temperature of about 200° to 300° C., preferably at a temperature of about 250° C., in the absence of pressure over a period ranging from about 12 minutes to 4 hours.

By virtue of the process according to the invention, structural elements can be provided in a simple manner with a firmly adhering, uniform coating which combines extreme hardness with resistance to weather.

The process according to the invention is illustrated by the following examples:

EXAMPLE 1

Production of coated concrete roof tiles

Portland cement and Rhine sand (particle size 0 to 3 mm) were intensively mixed in a ratio (by weight) of 1:3 in the presence of water (water/binder factor for cement 0.37).

The mixture was then processed into concrete roof tiles measuring 20×30 cm in a type 270065 test concrete roof tile machine (built in 1970 by Messrs. Ing. Kurt Schade).

The concrete roof tiles were hardened:
(a) for 48 hours at 28° C./90% relative air humidity in a conditioning chamber,
(b) for 6 hours at 65° C./95 to 100% relative air humidity in a steam chamber.

After hardening, the tiles were left standing for about 5 minutes to 1 hour so that any moisture adhering to them could evaporate.

A 10% aqueous calcium chloride solution was sprayed onto the surface of the hardened concrete roof tiles in a quantity of about 80 g per square meter and, after preliminary drying for about 5 minutes at room temperature, a waterglass paste having the following composition was applied to the surface thus treated of the concrete roof tiles:

| | |
|---|---|
| Sodium waterglass, 37 to 40° Be | 70 parts by weight |
| ZnO | 15 parts by weight |
| Kaolin | 5 parts by weight |
| Pigment (iron oxide) | 5 parts by weight |
| Water | 5 parts by weight. |

The waterglass paste was thinly sprayed on in a quantity of 400 g per square meter of concrete roof tile surface.

After standing in air for about 30 minutes, the paste on the surface of the concrete roof tiles was no longer fluid and had gelled to such an extent that the coating could be hardened. Hardening was carried out first over a period of 1 hour at 80° C., then over a period of 1 hour at 130° C. and finally over a period of 4 hours at 250° C. in a drying cabinet. Alternatively, instead of being carried out over a period of 4 hours in a drying cabinet, the subsequent hardening process was carried out in a jet dryer with a conveyor belt (manufacturers: Messrs. Werner & Pfleiderer) at temperatures of around 250° C. and with four additional heaters (output 1900 watts per heater) for a throughflow time of at least about 3×4 minutes. Hardening was then complete and the concrete roof tiles had a coherent, uniform coating.

EXAMPLE 2

Production of coated concrete roof tiles

Portland cement and Rhine sand (particle size 0 to 3 mm) were intensively mixed in a ratio (by weight) of 1:3 in the presence of water (water/binder factor for cement 0.37) with the following addition:

(a) 2% by weight of calcium chloride, based on cement,
(b) 2% by weight of calcium formate, based on cement.

The mixture was then processed into concrete roof tiles measuring 20×30 cm in a type 270065 test concrete roof tile machine (built in 1970 by Messrs. Ing. Kurt Schade).

The same waterglass paste as described in Example 1 was applied in a uniform layer thickness to the concrete roof tiles thus produced.

After standing in air for about 30 minutes, the paste on the surface of the concrete roof tiles was no longer fluid and had gelled to such an extent that hardening of the concrete roof tile and coating could be carried out. Hardening was carried out in the same way as described in Example 1. The hardened concrete roof tiles had a coherent uniform coating.

It will be appreciated that the instant specification and examples are set forth by way of illustration and not limitation, and that various modifications and changes may be made without departing from the spirit and scope of the present invention.

What is claimed is:
1. In the production of a coated concrete structural element by producing a workable composition of an appropriate inorganic binder and water, forming the composition into a concrete structural element, providing on the surface of the concrete structural element an inorganic salt selected from the group consisting of calcium formate, calcium chloride, calcium nitrate, magnesium nitrate, magnesium chloride, potassium chloride, sodium formate and sodium acetate, applying to the surface of the concrete structural element an aqueous paste containing at least one metal oxide and waterglass thereby to form a gel-like non-fluid coating and hardening the coated concrete structural element, the improvement which comprises hardening the concrete structural element prior to applying the aqueous paste thereto, whereby the resulting coating is of enhanced weather resistance.

2. A process as claimed in claim 1, wherein the inorganic salt is provided on the surface by being incorporated into the workable composition before forming it into the structural element, the salt being provided in at least about 0.5% by weight of the inorganic binder.

3. A process as claimed in claim 1, wherein the inorganic salt is provided on the surface as a component of an inorganic binder-containing facing layer of up to about 50 mm in thickness, the salt being provided in at least about 0.5% by weight of the inorganic binder in the facing layer.

4. A process as claimed in claim 1, wherein the inorganic salt is provided on the surface by spraying onto the formed structural element an aqueous solution thereof of a concentration of about 5 to 15% by weight in an amount sufficient to provide about 40 to 100 g of salt per m², followed by drying for about 3 to 15 minutes.

5. A process as claimed in claim 4, wherein the structural lement is first hardened prior to spraying of the inorganic salt solution.

6. A process as claimed in claim 1, wherein the structural element is a prefabricated concrete section or concrete roof tile.

7. A process as claimed in claim 1, wherein the aqueous paste also contains at least one pigment or filler.

8. A process as claimed in claim 1, wherein the inorganic binder comprises cement and the ratio by weight of water to cement is from about 0.3 to 0.7.

9. A process as claimed in claim 2, wherein the inorganic binder is cement, and the inorganic salt is present in the workable composition in from 0.5 to 5% by weight of the cement.

10. A process as claimed in claim 3, wherein the facing layer comprises cement, and the inorganic salt is present in about 0.5 to 5% by weight of the cement.

11. A process as claimed in claim 1, wherein the salt solution is of about between 5 and 15% concentration.

12. A process as claimed in claim 3, wherein the facing layer comprises cement and additives, the ratio by weight of water to cement ranging from 0 to about 0.5.

13. A process as claimed in claim 12, wherein the ratio of water to cement is from 0 to about 0.4.

14. A process as claimed in claim 1, wherein the aqueous paste comprises about 42 to 63 mole % of $SiO_2$, about 11 to 27 mole % of alkali metal oxide and about 19 to 42 mole % of metal oxide based on the total weight of alkali metal silicate plus metal oxide.

15. A process as claimed in claim 1, wherein about 200 to 500 g of paste are applied per square meter of surface to be coated.

16. A process as claimed in claim 1, wherein, after it has been applied to the structural element, the paste is hardened at ambient temperature over a period of about 0.5 to 1 hour.

17. A process as claimed in claim 1, wherein, before applying the paste, the structural element is hardened by standing in air for about 14 to 28 days or in moisture and steam for about 22° to 65° C.

18. A process as claimed in claim 1, wherein the paste-coated structural element is hardened at about 150° to 210° C. under a pressure of about 4 to 19 bars.

19. A process as claimed in claim 18, wherein the temperature is about 170° to 180° C., the pressure is about 7 to 10 bars and the hardening time is from about 4 to 8 hours.

20. A process as claimed in claim 1, wherein the paste-coated structural element is hardened in a drying cabinet at a temperature of about 200° to 300° C.

21. A process as claimed in claim 20, wherein the hardening time is about 1 to 4 hours.

22. A process as claimed in claim 1, wherein the paste-coated structural element is hardened in a jet dryer with a conveyor belt at a temperature of about 250° C.

23. A process as claimed in claim 22, wherein the hardening time is at least about 12 minutes.

24. A hardened coated structural element produced by the process of claim 1.

* * * * *